US011412881B2

(12) United States Patent
Giordano et al.

(10) Patent No.: US 11,412,881 B2
(45) Date of Patent: Aug. 16, 2022

(54) DEVICE FOR MAKING COFFEE

(71) Applicant: Bernard Giordano, Cleveland, OH (US)

(72) Inventors: Bernard Giordano, Cleveland, OH (US); Alex Weaver, Brighton, CO (US)

(73) Assignee: Bernard Giordano, Cleveland, OH (US)

( * ) Notice: Subject to any disclaimer, the term of this patent is extended or adjusted under 35 U.S.C. 154(b) by 307 days.

(21) Appl. No.: 16/618,081

(22) PCT Filed: Jan. 24, 2019

(86) PCT No.: PCT/US2019/014948
§ 371 (c)(1),
(2) Date: Nov. 27, 2019

(87) PCT Pub. No.: WO2019/147807
PCT Pub. Date: Aug. 1, 2019

(65) Prior Publication Data
US 2020/0281393 A1 Sep. 10, 2020

Related U.S. Application Data

(60) Provisional application No. 62/622,437, filed on Jan. 26, 2018.

(51) Int. Cl.
*A47J 31/06* (2006.01)
(52) U.S. Cl.
CPC .................................... *A47J 31/06* (2013.01)
(58) Field of Classification Search
CPC ........................................................ A47J 31/06
USPC ............................................................ 99/279
See application file for complete search history.

(56) References Cited

U.S. PATENT DOCUMENTS

| 1,370,782 | A | 3/1921 | Calkin |
| 1,743,925 | A | 1/1930 | Krause |
| 2,900,896 | A | 8/1959 | Bondanini |
| 2,910,183 | A | 10/1959 | Hayes |
| 3,336,857 | A | 8/1967 | Knodt et al. |
| 4,253,959 | A | 3/1981 | Tafara |

(Continued)

FOREIGN PATENT DOCUMENTS

WO 2019147807 A2 8/2019

OTHER PUBLICATIONS

Handground, "An Intuitive Guide to Coffee Solubles, Extraction and TDS", Retrieved At: <<https://handground.com/grind/an-intuitive-guide-to-coffee-solubles-extraction-and0tds>>, Retrieved Date: Jan. 23, 2018, 20 pages.

(Continued)

*Primary Examiner* — Omar Flores Sanchez
(74) *Attorney, Agent, or Firm* — Eschweiler & Potashnik, LLC

(57) ABSTRACT

A filter and multi-part brewing system for making excellent coffee of the pour over type are disclosed. A filter includes a circumferential wall that runs from a top rim to a bottom surface. The bottom surface of the filter is an undulating surface comprising a plurality of mini-cone units arranged in a waffle pattern, the mini-cone units comprising one or more holes. The brewing system comprises multiple sections configured to fit together with a filter and drip holes dimensioned for making excellent coffee.

20 Claims, 9 Drawing Sheets

(56) References Cited

U.S. PATENT DOCUMENTS

| 5,304,305 A * | 4/1994 | Lehrer | A23F 5/185 |
| | | | 210/346 |
| 2013/0186280 A1* | 7/2013 | Sekiguchi | A47J 31/005 |
| | | | 99/287 |
| 2015/0173556 A1* | 6/2015 | Freeman | A47J 31/06 |
| | | | 99/295 |
| 2017/0095107 A1 | 4/2017 | Chen | |

OTHER PUBLICATIONS

Salim, et al., "Effect of Shape and Parameters of Perforation in a Vertical Wellbore with Two Perforations (without Porous Media) on Pressure Drop", Retrieved At: <<https://www.omnisonline.org/open-access/effect-of-shape-and-parameter . . . >>, Retrieved Date: Jan. 23, 2018, Jun. 25, 2017, 9 pages.

Thomas, Shane, "International Search Report and Written Opinion for PCT Patent Application No. PCT/US19/14948", dated Jul. 30, 2019, 16 pages.

* cited by examiner

DEVICE FOR MAKING COFFEE

CROSS-REFERENCE TO RELATED APPLICATIONS

This application is a national stage application of PCT/US2019/014948, filed on Jan. 24, 2019, published as WO 2019/147807, which in turn claims the benefit of priority to U.S. provisional application 62/622,437, filed Jan. 26, 2018, which is hereby incorporated by reference for all purposes.

FIELD

This disclosure relates to coffee brewing devices, more particularly, to pour over coffee devices.

BACKGROUND

A variety of devices are available for making coffee. These include, amongst others, drip brewers, French press, stove-top, vacuum devices, Turkish pots, cold brew, and pour over devices. Pour over coffee can be made by manually pouring water over the ground beans, being very careful to not over or under saturate the grounds. If this is done well, a pour over coffee can provide an optimal extraction of the flavor of the beans without bitterness or other undesirable flavors. However, this requires a well-trained barista, a steady hand, and is time-consuming. Typically, the pour over is done with a large cone made of plastic, ceramic or metallic mesh with a paper filter typically being inserted in these large cones. Devices that make pour over coffee automatically or semi-automatically are available; however, they suffer from problems of erratic flow/drip rates, inconsistent extraction of desirable coffee solubles, or problems, such as with quality.

SUMMARY

A coffee filter and system are disclosed herein.

In an embodiment, a filter includes a bottom surface that is an undulating surface comprising a plurality of mini-cone units arranged in a waffle pattern. The mini-cone units comprise one or more holes.

In an embodiment, a system for brewing coffee includes a top section including a first circumferential wall, the top section being open at a top and including a drip plate with drip holes at a bottom; a middle section including a second circumferential wall, the middle section being open at a top and a bottom, the middle section coupled to a filter with a bottom surface comprising holes; and a bottom section including a third circumferential wall, the bottom section being open at a top and closed at a bottom. The top section, the filter, middle section, and the bottom section are configured to fit together. The bottom surface of the filter is an undulating surface comprising a plurality of mini-cone units, the mini-cone units comprising one or more holes.

In an embodiment, a system for brewing coffee includes a top section including a first circumferential wall, the top section being open at a top and including a drip plate with drip holes at a bottom; a middle section including a second circumferential wall, the middle section being open at a top and a bottom, the middle section coupled to a filter with a bottom surface comprising holes; and a bottom section including a third circumferential wall, the bottom section being open at a top and closed at a bottom. The top section, the filter, middle section, and the bottom section are configured to fit together. A total hole diameter of all the drip holes and all the holes of the filter is 1:100 to 1:10.

Other features and advantages of the present invention will become apparent from the more detailed description below when taken in conjunction with the accompanying drawings.

DETAILED DESCRIPTION

In the following description, for purposes of explanation, numerous specific details are set forth in order to provide a thorough understanding of one or more aspects. It may be evident, however, that such aspect(s) may be practiced without these specific details.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a," "an," and "the," as used in this application and the appended claims should be construed to mean "one or more" unless specified otherwise or clear from the context to be directed to a singular form. Additionally, as used herein, the term "exemplary" is intended to mean serving as an illustration or example of something, and is not intended to indicate a preference.

Figure 1:
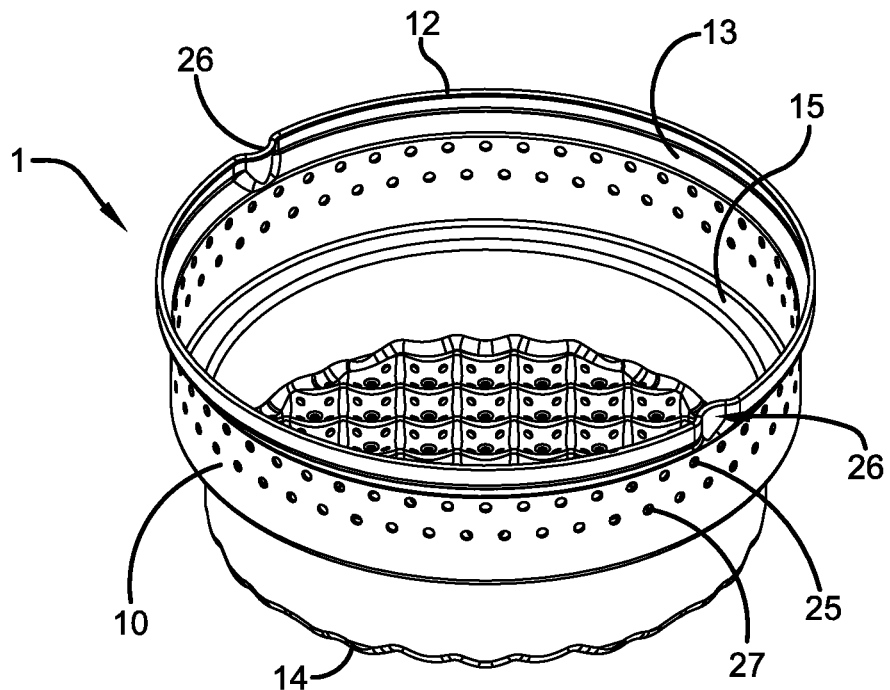
FIG. 1 shows a perspective view of an exemplary filter.
Figure 2:
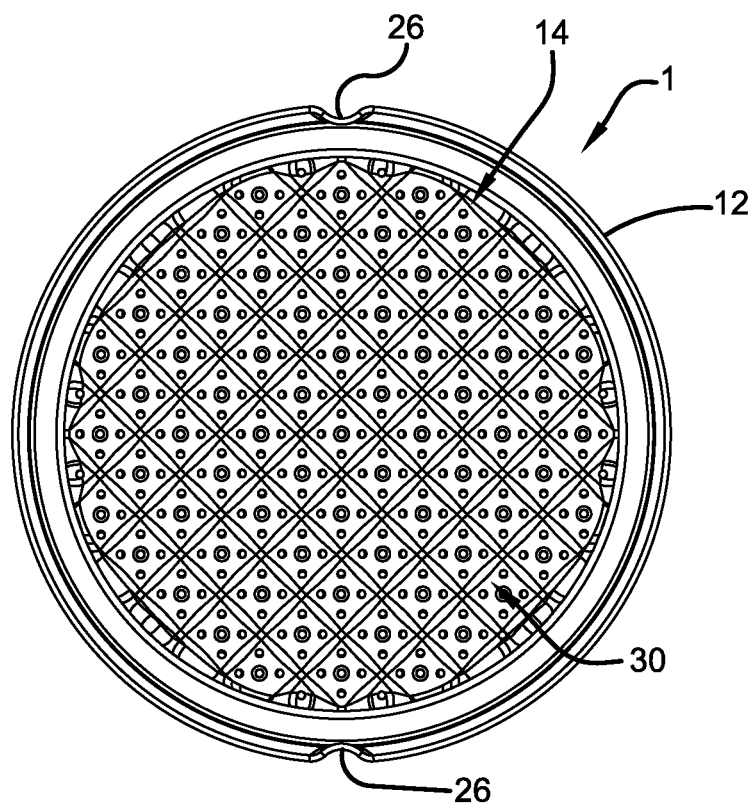
FIG. 2 shows a top-down view of the exemplary filter.
Figure 3:
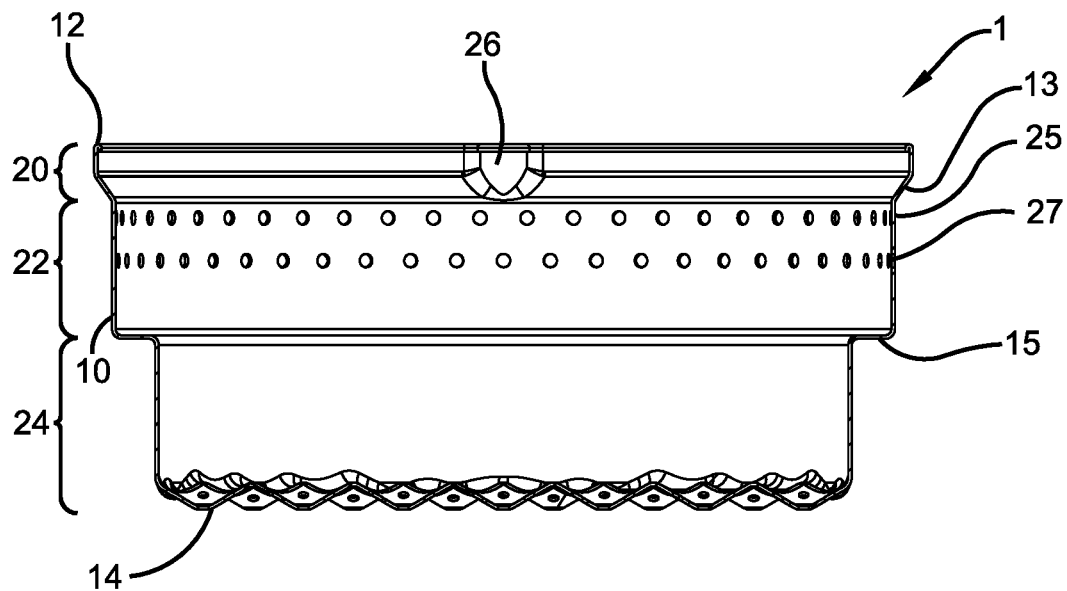
FIG. 3 shows a side cross-section side view of the exemplary filter.

A device for making pour over coffee is described herein that has mechanical and geometric features allowing it to consistently produce excellent coffee. By excellent coffee it is meant that the coffee has an optimal extraction rate to promote commonly agreed upon best qualities, such as full-bodied, smooth, and highlighting the unique qualities of the particular beans, while leaving the bitter, woody flavors unextracted. Several features contribute to its design, including a unique filter design to provide a new and surprising solution to enable the most desirable coffee flavors to be extracted into the water. An example of this filter is shown in FIGS. 1-3.

The waffle coffee filter is a grid of multiple units with depressions and holes which corrects design flaws in pour-over coffee filters that are subject to erratic flow/drip rates and inconsistent extraction of desirable coffee solubles. Some existing pour-over methods employ single-cone filters. The cone configuration serves to funnel the water down through the coffee bed toward the hole(s). Water flowing through a single, large conical filter with an uninterrupted bed of coffee grinds can often result in considerable displacement of the grinds, leading to shifting flow rates and uneven saturation and extraction of solubles. Additionally, the uninterrupted coffee bed in the single cone promotes the tendency of "caking" in which the grounds form a compacted mass which significantly slows the percolation of water down through the coffee. The multiple small "cones" of the filter dispersed in a "waffle" configuration disclosed herein encourage the even distribution of hydrostatic pressure across the coffee bed, resulting in minimal displacement of grounds, promoting even-saturation and encouraging optimal flow through the multiple angled perforations. Additionally, the size and distribution of the filter's perforations promotes a high degree of filtration without the requirement of a paper filter, producing brewed coffee of remarkable clarity.

In an embodiment, the filter is engineered for a total brew time of approximately 3.75 or 4 minutes, depending on grind, water volume, and grind volume. Brew times of 3.25 to 4.5 minutes, such as 3.5 to 4.35 may also be achieved for about 12 ounces of water, e.g., 8 to 16 ounces or 10 to 14 ounces. If other amounts of coffee are desired, e.g. about 24 ounces, such as 20 to 28 ounces or 22 to 26 ounces, dimensions could be upscaled approximately proportional to allow for such. The target time and water content (along with the right amount of coffee (i.e. the "golden ratio" such as 15:1 to 18:1 water to coffee grounds) permits the most desirable coffee oils to be extracted, including organic compounds which are often lost to paper filters, while preventing the less-desirable, bitter, woody or dusty flavor notes to pass into the brewed coffee. Thus, the filter disclosed herein helps correct the problems of "over-extraction" and "under-extraction" in pour-over coffee preparation.

FIGS. 1-4 show an exemplary filter 1 suitable for use in a pour over coffee-making device, or other coffee-making device. The filter 1 has a generally cylindrical outer circumference. The filter 1 has a circumferential wall 10 that runs from a top rim 12 to a bottom surface 14. The wall 10 generally defines three concentric levels, a top level 20 around the rim 12 has the largest circumference, a middle level 22 has a smaller circumference, and bottom level 24 has yet a smaller circumference that at the bottom corresponds to the circumference of the bottom surface 14, that it is joined to. Transitions between the levels are angled or horizontal concentric segments 13, 15. In an embodiment, two or more concentric levels may be joined by one or more angled or horizontal transition segments.

The rim 12 and top level 20 have two inset features 26 that are offset by 180 degrees. These inset features 26 are for the purpose of lining up with and fitting with a concomitant feature on a middle portion of a pour over device. This insures a precisely aligned fit.

The middle level 22 of the filter 1 includes two rows of bloom holes 25, 27 periodically arranged around the circumference of the wall 10. In this embodiment, the first row of bloom holes 25 is offset from the second row of bloom holes 27. That is, the bloom holes in the first row 25 fall about mid-way (circumferentially) in between the bloom holes of the second row 27. The first and second row bloom holes 25, 27 are to prevent overflow and prevent over-extraction and may aid in venting pressure. In operation, when the water first begins to drip onto the dry coffee grounds in the filter 1, gases are released from the beans which causes the bed of grinds to swell upward. This phenomenon is called "bloom," and the first and second row holes 25, 27 allow for the additional drainage when the bed of coffee swells up. Thus, the first and second row holes 25, 27 are a precautionary measure to prevent overflow, and also they contribute to keeping the flow rate steady so that water does not sit on the coffee grounds too long, resulting in over-extraction.

The bottom level 24 of the wall 10 is intended to hold the coffee grounds and does not contain any holes. The top of bottom level 24 is the intended "fill-level" for the appropriate amount of coffee grounds. Alternatively, a fill level indicator may be printed or engraved or embossed on the wall 10.

Figure 4:
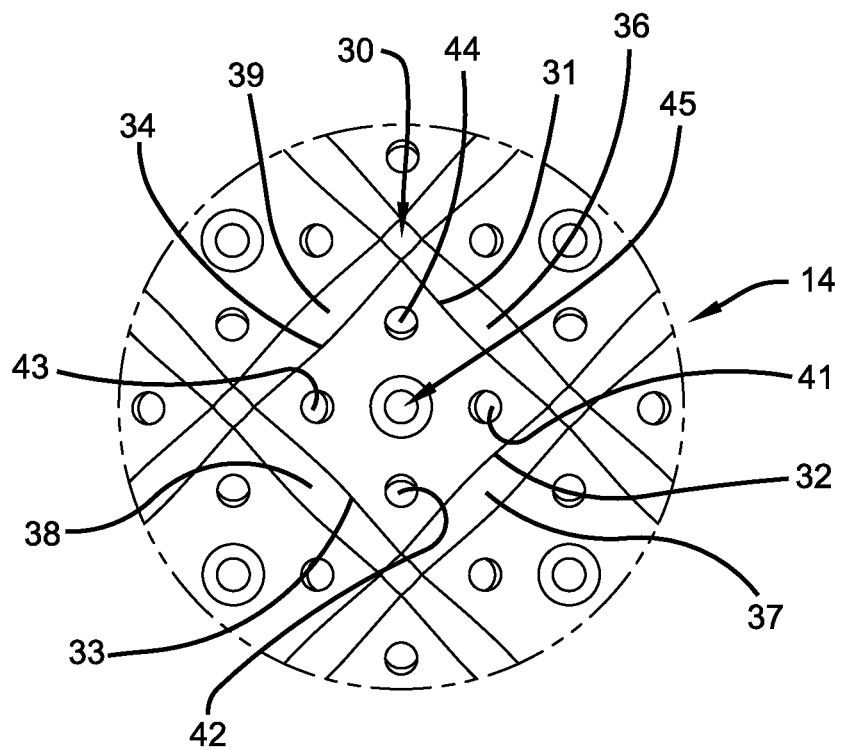
FIG. 4 shows a top-down zoomed-in view of a mini-cone unit the exemplary filter.
Figure 6:
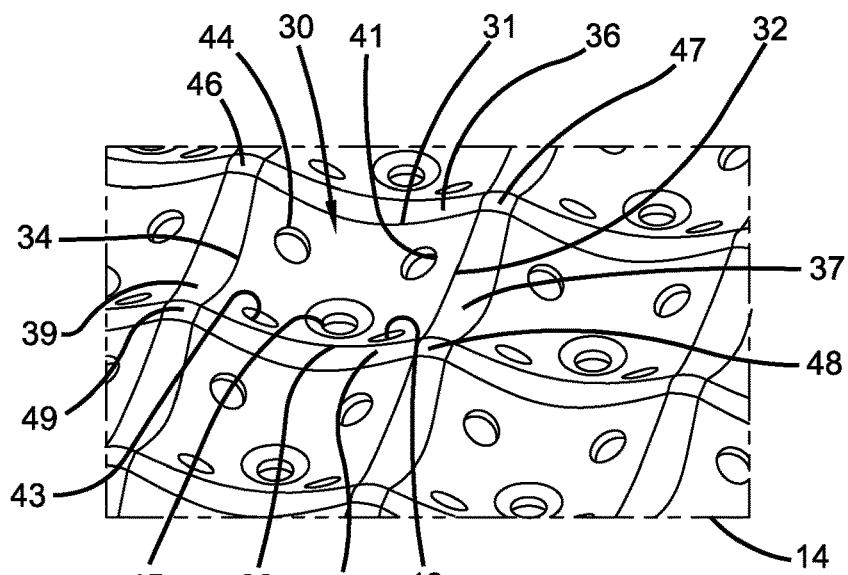
FIG. 6 shows a zoomed-in perspective view of the exemplary filter surface.

The bottom surface 14 of the filter 1 is an undulating surface comprising a plurality of square mini-cone units 30 arranged in a waffle pattern. FIGS. 4 and 6 show a zoomed view of a mini-cone unit 30. Each full unit 30 has a square footprint area bounded by a raised surface boundary 31-34 that is higher at the corner of the unit 30 than at the mid-point of the unit 30. Transition areas 36-39 between each unit 30 are disposed between the raised surface boundaries 31-34. In this embodiment, these transition areas 36-39 are further raised over the raised boundaries 31-34 and contoured to provide a smooth surface. In an embodiment, the intersections 46-49 of the transition areas 36-39 are the highest areas of the undulating bottom surface 14. To further describe the mini-cone unit 30 in this embodiment, the mini-cone unit 30 has an approximately frusto-conical shape with a footprint of a square, which may also be described as a frusto-pyramidal shape with rounded edges.

In an embodiment, the mini-cone unit 30 has a frusto-conical shape or a a frusto-pyramidal shape.

In an exemplary embodiment, each mini-cone unit 30 has five holes 41-45. Four side holes 41-44 are disposed on upwardly (from the center) sloping sides of the unit 30. These holes 41-45 are drilled through at a right angle to the sloped surface, but in an embodiment could also be drilled straight down. The single trough hole 45 is disposed at the bottom or trough of the mini-cone unit 30 and is drilled straight down in this embodiment. The holes 41-45 are configured and dimensioned to allow the water to pass through but retain the coffee grounds in the bottom level 24 of the filter 1. For example, the holes 41-45 may have diameters of 0.02 to 0.08 inches, such as 0.03 to 0.05 inches, or 0.035 to 0.045 inches. In an embodiment, if there are no coffee grounds in the filter, 12 ounces of boiling water takes approximately 3 minutes and 25 seconds to filter through the holes of the filter 1. In other embodiments this time may be 3 to 4 minutes, such as 3.1 to 3.75 minutes, or 3.25 to 3.65 minutes.

Figure 5:
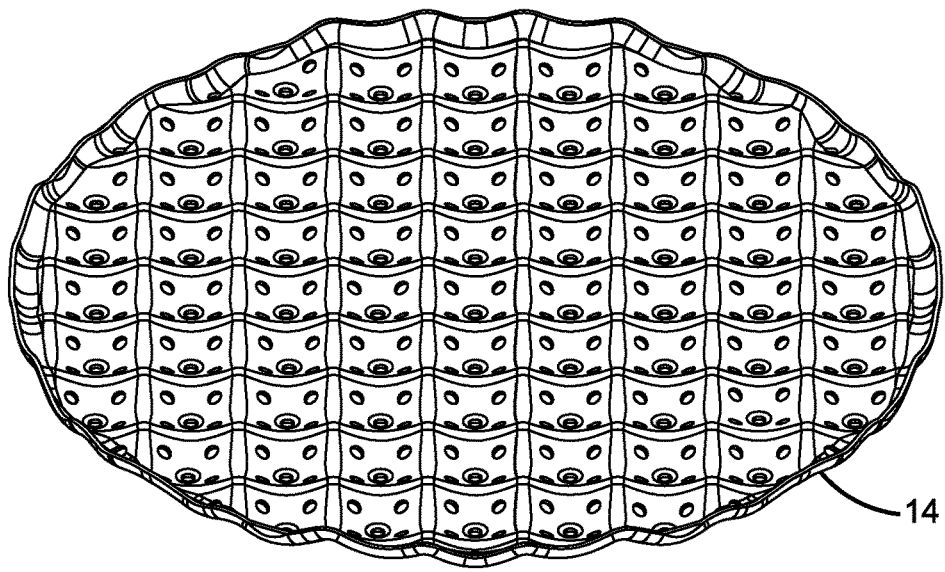
FIG. 5 shows an isolated perspective view of the exemplary filter surface
Figure 7:
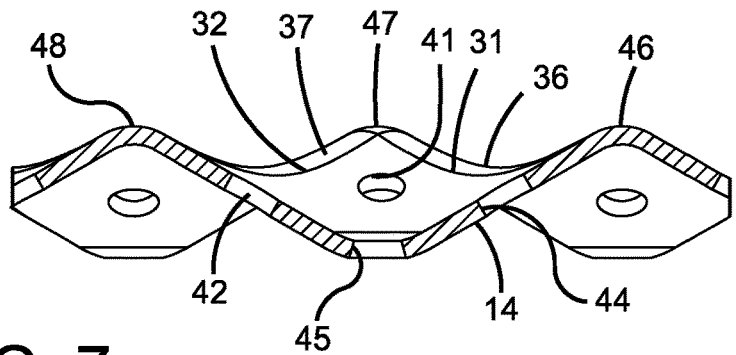
FIG. 7 shows a side cross-sectional view of the exemplary filter surface.

FIG. 3 shows a cross-section of the filter 1 and FIG. 7 is a zoomed in cross-sectional view of the bottom surface 14 of the filter 1. FIG. 7 clearly shows a cross-section of the bottom surface 14 bisecting some of the trough holes 45 of the units 30. It can be seen from this view in FIG. 7 that the cross-section of the bottom surface 14 has an approximately sinusoidal wave shape, not counting the missing material where the trough hole 45 is present. This approximately sinusoidal wave shape is observed in the cross-sections of the bottom surface 14 that bi-sects trough holes 45 at the center of the mini-cone units 30 and the crests of the intersections 46-49 of the mini-cone units 30. More generally the bottom surface 14 may be described as having alternating sequences of concave and convex portions. FIG. 5 shows an additional view of the bottom surface 14 of the filter 1.

At the outer circumferential edge of the bottom surface 14 near to the wall 10 of the filter 1, the undulating bottom surface 14 and mini-cone units 30 are disrupted in favor of a transitional area that transitions from undulating to level or vertical, in order to couple to the even, level bottom surface of the wall 10.

All the dimensions and scales shown in FIGS. 1-4 and disclosed herein may be varied in other embodiments, such as, for example, by plus or minus 100%, plus or minus 20%, or plus or minus 10%. In addition, the size of the holes 41-45 (about 0.04 inch diameter) may also vary by smaller margins, such as, for example, plus or minus 5%, plus or minus 2.5%, or plus or minus 1%. Advantageously, the through holes are not so large as to allow coffee grounds through. The approximately sinusoidal shape of the cross-section of the bottom surface 14, may vary from a sine wave by plus or minus 100%, plus or minus 20%, or plus or minus 10% at any point along the wave. (This may be judged by an envelope around a sinusoidal wave shape with a sine wave best fitted to match the curves of the cross-section. The size of the envelope is determined by plus or minus the percent given of the amplitude of the sine wave. For example, with a 100% envelope, if a point selected on an actual cross-section surface is 0.02 inches from the best fit sine wave for the cross-section, then it would fit just within an envelope of 100% of a sine wave with an amplitude of 0.01 inches.) Accordingly, the cross-section may vary from a pure sine wave and approximate a triangular or various irregular wave forms. The mini-cone units 30 need not be identical, nor must they necessarily cover the entire bottom surface 14. In an embodiment, the mini-cone units 30 may be consecutively placed with no intervening space, and may have a peak-to-peak distance of 0.15 to 1 inch, such as 0.2 to 0.4 inches, or 0.25 to 0.33 inches. In an embodiment, the height from peak to trough of the mini-cone units is 0.01 to 0.5 inches, such as 0.03 to 0.2 inches, or 0.05 to 0.1 inches. Ratios of the recited peak-to-peak and peak-to-trough distances may also define the surface. The exact surface geometry shown in the figures need not be adhered to in order to achieve advantageous improvement over a flat or single cone-shaped filter. For example, so long as there is a plurality of units with a generally conical or semi-conical shape, e.g., a conical shape with four corners, other geometrical features may not be necessary to achieve some benefit. In an embodiment, there may be no transitional areas, or the mid-point of the transitional areas need not be raised. In an embodiment, there may be only one hole or up to 100 holes per unit 30, depending on the size of the unit 30, for example, the unit 30 may have 2 to 75 holes, or 3 to 10 holes. In an embodiment, the units are not squares in terms of footprint areas, but are other polygonal shapes, such as, for example, triangles, or octagons.

In an embodiment, the total number of all filter holes 41-45 may be 100 to 800, such as 200 to 600, or 350 to 450. The total number of all mini-cone units 30 in the filter 1 may be 4 to 200, such as 20 to 250, or 50 to 120. The total hole diameter of all the filter holes 41-45 may be 1 inch to 20 inches, such as 5 to 18 inches, or 10 to 17 inches. The ratio of the total hole diameter of all the drip holes 161 and the filter holes 41-45, may be 1:100 to 1:10, such as 1:80 to 1:20, or 1:75 to 1:55. In an embodiment, the drip holes 161 and filter holes 41-45 have a diameter ratio of 1:5 to 6:5, such as, for example, 1:3 to 1:1, or 2:3 to 4:5.

Figure 8:
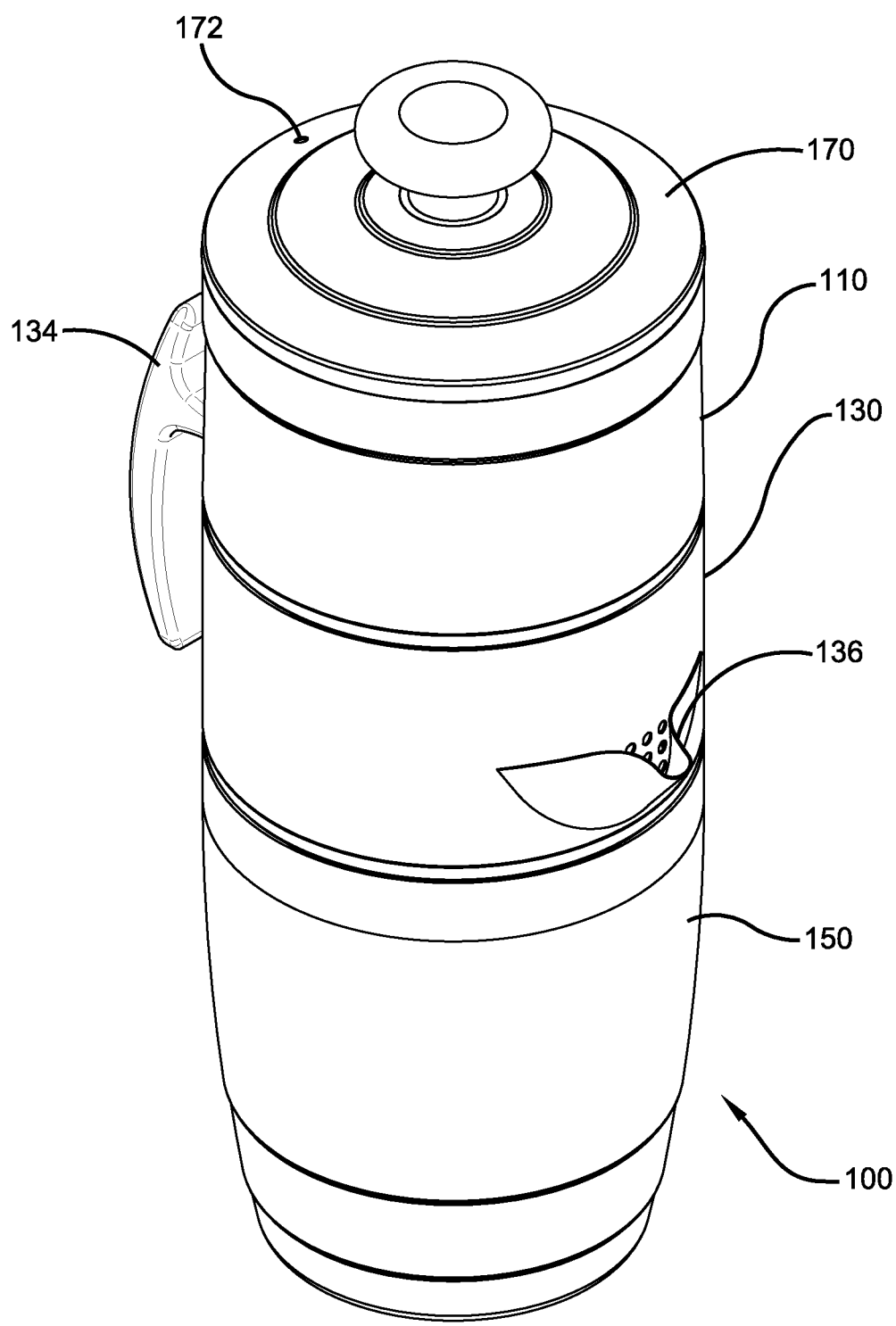
FIG. 8 is a perspective view of an exemplary pour-over device.
Figure 9:
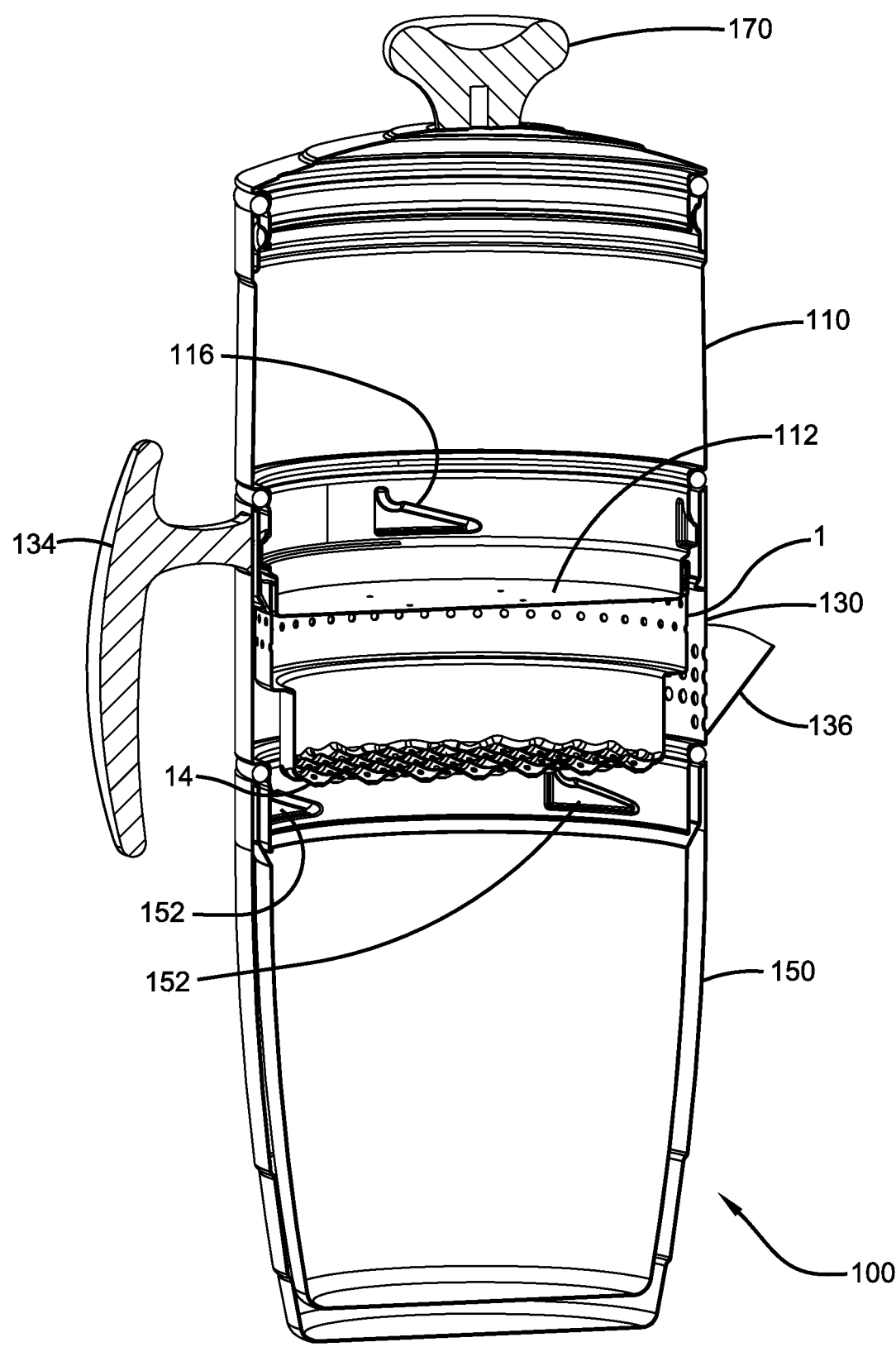
FIG. 9 is a perspective cross-sectional view of an exemplary pour-over device.
Figure 10:
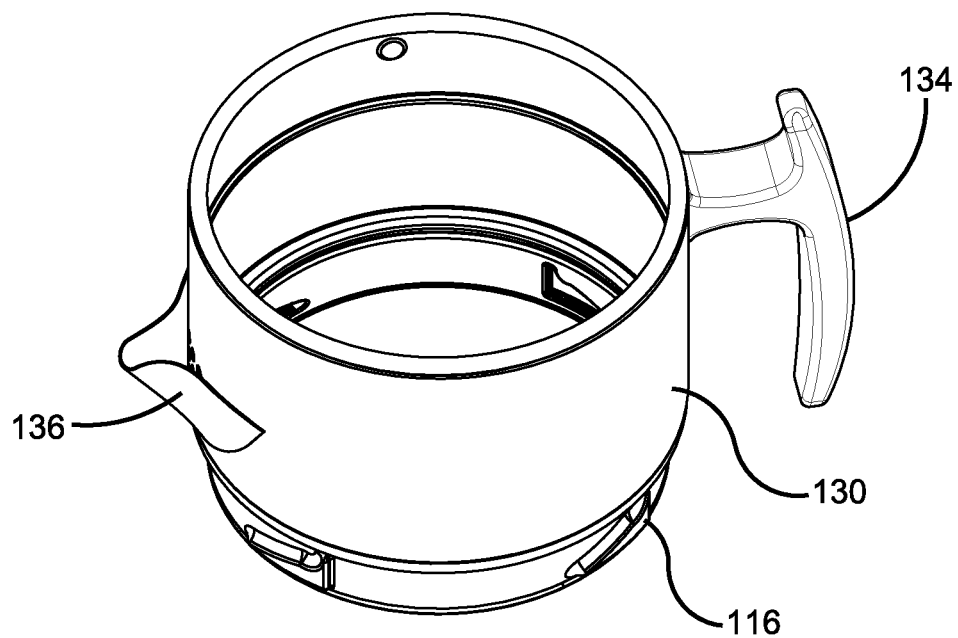
FIG. 10 is a perspective view of a middle section of an exemplary pour-over device.
Figure 11:
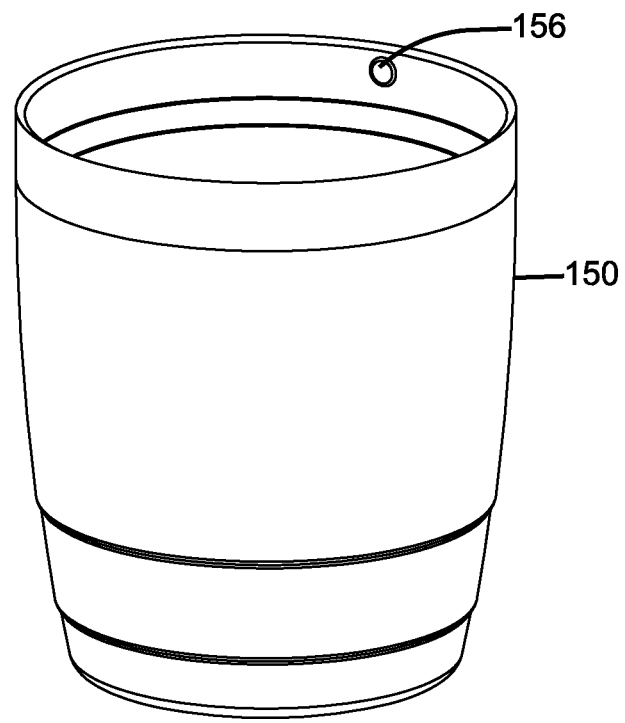
FIG. 11 is a perspective view of a bottom section of an exemplary pour-over device.
Figure 12:
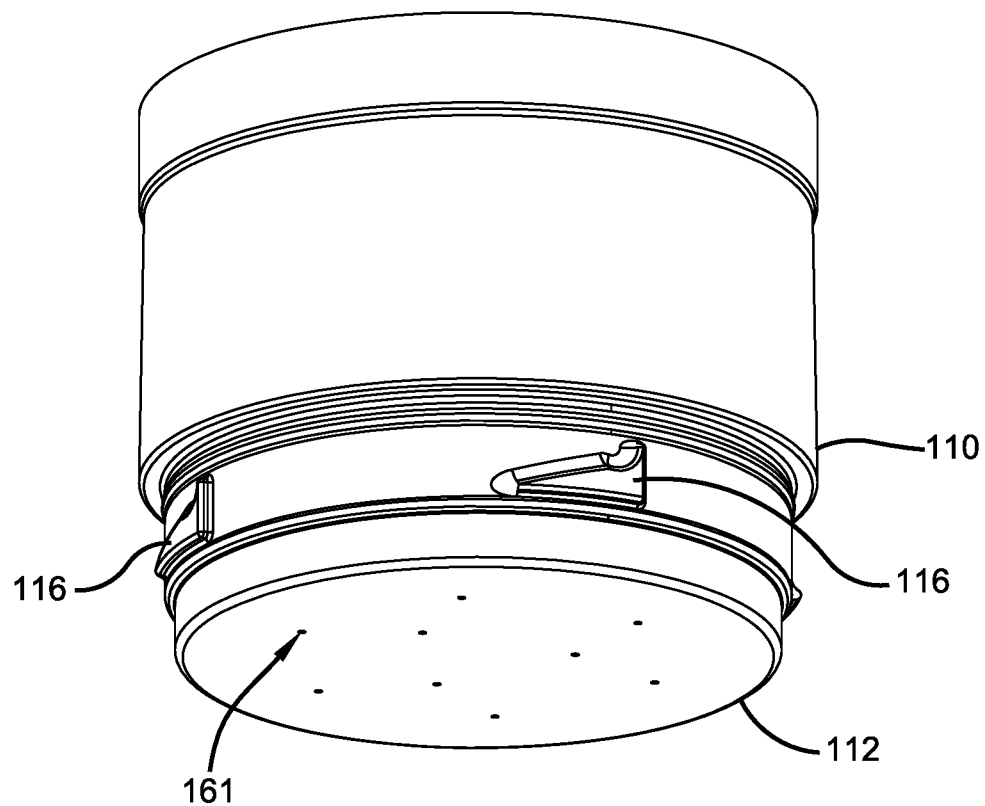
FIG. 12 is a perspective view of a top section of the exemplary pour-over device
Figure 13:
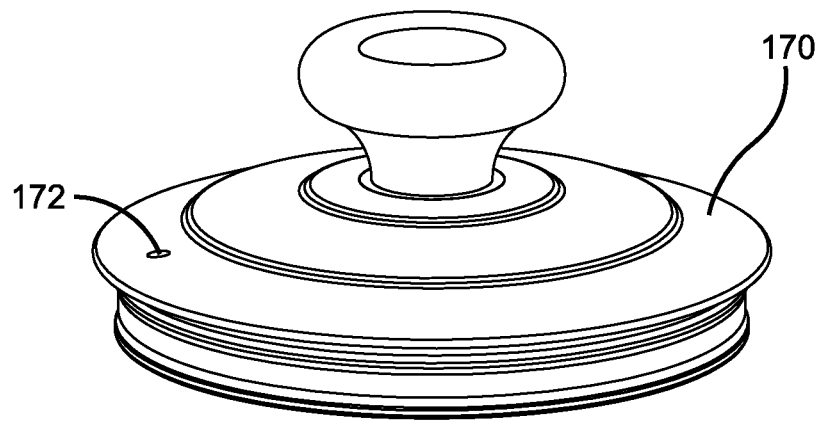
FIG. 13 is a perspective view of a lid of the exemplary pour-over device.

FIGS. 8-13 are perspective views of the several components of the exemplary pour-over device 100 (or generally described as a coffee brewing device). FIG. 8 is a perspective view of an exemplary pour-over device 100 being fully constructed, and FIG. 9 shows a perspective cross-sectional view of the same exemplary pour-over device 100. FIG. 10 is the middle section 130. FIG. 11 illustrates the bottom section 150. FIG. 12 shows the top section 110, and FIG. 13 shows the lid 170.

As shown in FIGS. 8 and 9, the pour-over device 100 includes a top section 110, a middle section 130, a bottom section 150, and a lid 170. FIG. 9 shows the filter 1 as it fits into the middle section 130. The top section 110, includes a drip plate 112, which fits onto the top of the filter 1 and sets on top of the middle section 130. The middle section 130 includes a handle 134 and a spout 136, and fits into and sets on top of the bottom section 150. The filter 1 is designed to fit into and seat onto the middle section 130. The filter 1 and the middle section 130 can be pulled apart for occasional scrubbing/washing, but these can also be left joined together and to be rinsed off and remain as a joined piece. Fitment features 116, 152 are provided on the interior of the middle section 130, and the bottom section 150, respectively. Each of these fit into concomitant protruding features on the top and middle sections 110, 130, respectively. (See FIG. 11 for an example protruding feature 156.) These features allow for a twist and lock action to secure the sections together. Multiple fitment features 116, 152 and concomitant protruding features (e.g. 156) may be disposed around the circumference of the respective walls, to provide a secure connection. Holes in the outer wall of the middle section 130 are provided behind the spout 136 and an opening from the bottom section 150 to the spout allows coffee to be poured from the spout 136.

The upper section 110 is designed to drip water through the drip plate 112 via drip holes 161 into the filter 1 to provide a consistent volume of water. In an embodiment, the water will drip into the filter 1 at the same rate or about the same rate that it is filtered into the bottom section 150. In this embodiment, the drip holes 161 have a diameter of 0.028 inches. This may vary in other embodiments, such as 0.01 to 0.05 inches, or 0.02 to 0.04 inches, or 0.025 to 0.03 inches, and may depend on the number of drip holes 161 and the flow rate of the filter 1. In an embodiment, there are 5 to 50 drip holes, such as 7 to 20, or 8 to 15 drip holes 161. The total hole diameter of all the drip holes 161 may be 0.1 to 1 inch, such as 0.15 to 0.5 inches, or 0.2 to 0.4 inches. The drip holes 161 may have diameters smaller than the holes 41-45 (described below) of the filter 1.

FIG. 12 shows a pattern of drip holes 161 at the bottom of the top section 110 comprise inner and outer concentric rings, wherein the outer ring includes six drip holes 161, and the inner ring includes three drip holes 161 spaced nearer the axial center of the top section 110 than the drip holes 161 in the outer ring. The drip holes 161 of the inner ring are spaced equidistant from the nearest two drip holes 161 in the outer ring. This aids in a uniform dripping across the surface of grounds.

The lid 170 attaches to the top section 110. In an embodiment, a separate lid with an opening for sipping can be attached to the top of the bottom section 150 after the coffee has been made. The lid 170 includes a hole 172 for venting, which may, for example, have a diameter of 0.05 to 0.2, such as 0.07 to 0.15, or 0.08 to 0.125 inches. The lid 170 is also configured to attach to the top of the middle section 130 and bottom section 150.

The multiple mini-cone units 30 in the filter 1 minimize the displacement of the coffee grounds. This is in contrast to a single large cone filled with coffee grounds, where the water causes the bed of coffee to shift, often building up on the sides and burrowing a hole in the center. This causes a situation where the grounds are not evenly wetted and some are in contact with water for considerably longer, thereby causing the bitter, woody or dusty flavors to leach out due to over-saturation. The multiple mini-cone units 30 promote uniform axial flow as the water evenly flows though the grounds on its way through the filter 1 to the bottom section 150. Furthermore, it promotes anti-stagnation and increased surface area over a cone or flat-bottomed design.

The size and number of the perforations (or drip holes) 161 affect the coffee taste. Assuming that the drip into the filter 1 is at approximately the same rate as the drip into the bottom section 160 (carafe), there is a fixed amount of hydrostatic pressure at the bottom surface 14 (filter surface) caused by the level of water in the chamber (more water equates to more pressure). The size of the holes 41-45 in conjunction with the number of holes 41-45 affects how fast the water drains through given the fixed amount of pressure.

The sloped holes 41-44 (i.e. those on the slope of the mini-cones and sloped compared to the major plane of the bottom surface 14) promote expeditious dripping, and combined with the waffle mini-cone units 30, the trough hole 45, and the hole distribution and sizes, the drainage is synergistically ideal. This is different from flat-bottomed perforated metal filters, where the perforation size is fine, but the water all lands on the flat bottom of the filter and then must travel horizontally to find a hole, again leading to un-even wetting.

The pour over device 100 can be made of various materials, including, for example, titanium, aluminized steel, and stainless steel by sheet metal fabrication, such as deep drawing for the overall filter shape and stamping for the patterning of the bottom surface 14. Plastic or silicon can be used for the top knob on the lid 170 and handle 134. Other materials that can be used, include, for example, anodized aluminum, ceramic, porcelain, or plastic.

In a method of use, the pour over device 100 is used by:
1) Securing the middle section 130 including the filter 1 on the bottom section 150 and adding (e.g. spoon in) coffee grounds (to the fill line) into the middle section 130 onto the bottom surface 14 of the filter 1, which is about 22 grams, such as 20 to 24 grams, or 21 to 23 grams of coffee grounds.
2) Securing the top section 110, including the drip plate 112 on top of the middle section 130 and filter 1.
3) Pouring in about 12 ounces of boiling water (up to the fill-line in the water reservoir).
4) Covering with the lid 170 and allowing the water to drip (through the grounds and filter 1) for approximately 3.5 minutes or another time range stated above, thereby forming coffee in the bottom section 150.
5) Pouring the coffee from the spout 136 into a mug or cup for drinking or removing the bottom section 150 for drinking directly from the bottom section 150.

In an embodiment, the filter 1 disclosed herein could be used for filtration of other liquids through particulates (or other materials), such as, for example, tea, fruit, or vegetable juices.

Figure 14:
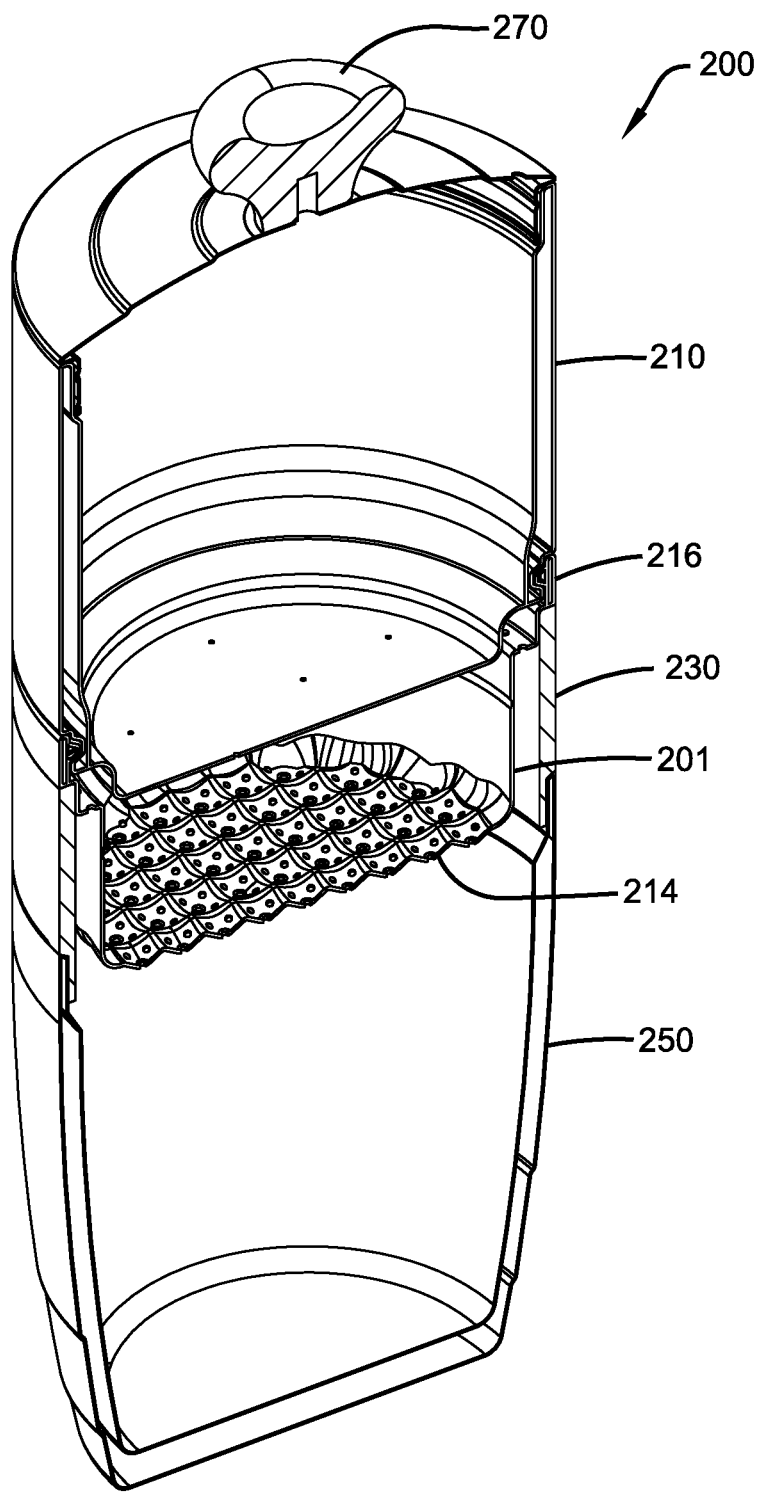
FIG. 14 is a cross-section of a second embodiment of a coffee brewing system.
Figure 15:
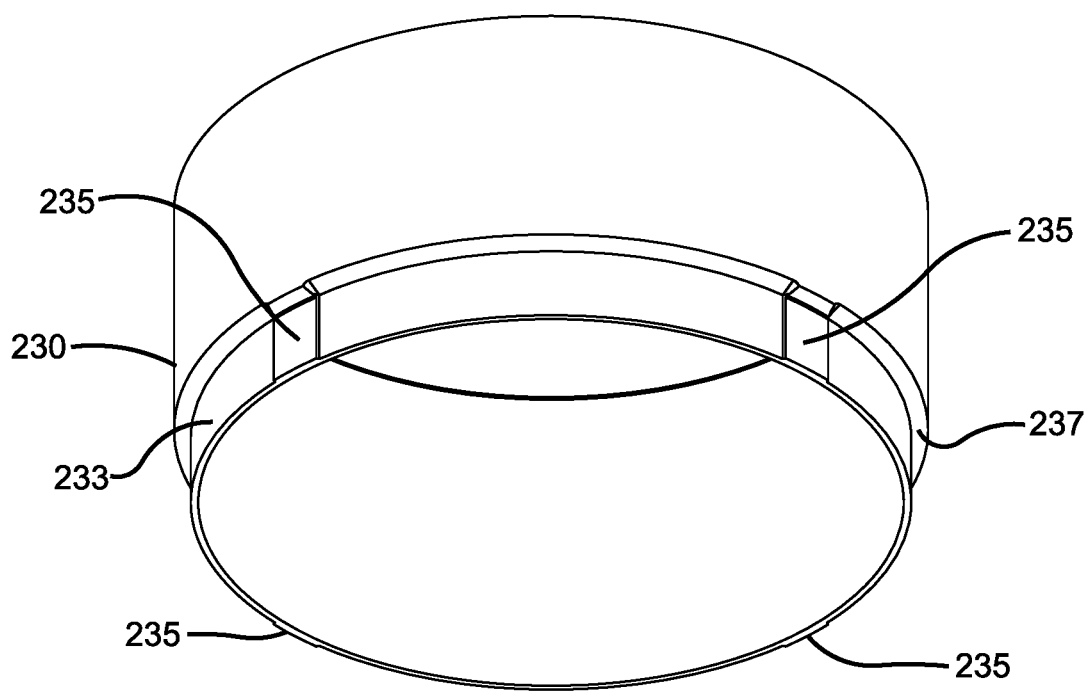
FIG. 15 is a perspective view of a middle section in a secondary embodiment.
Figure 16:
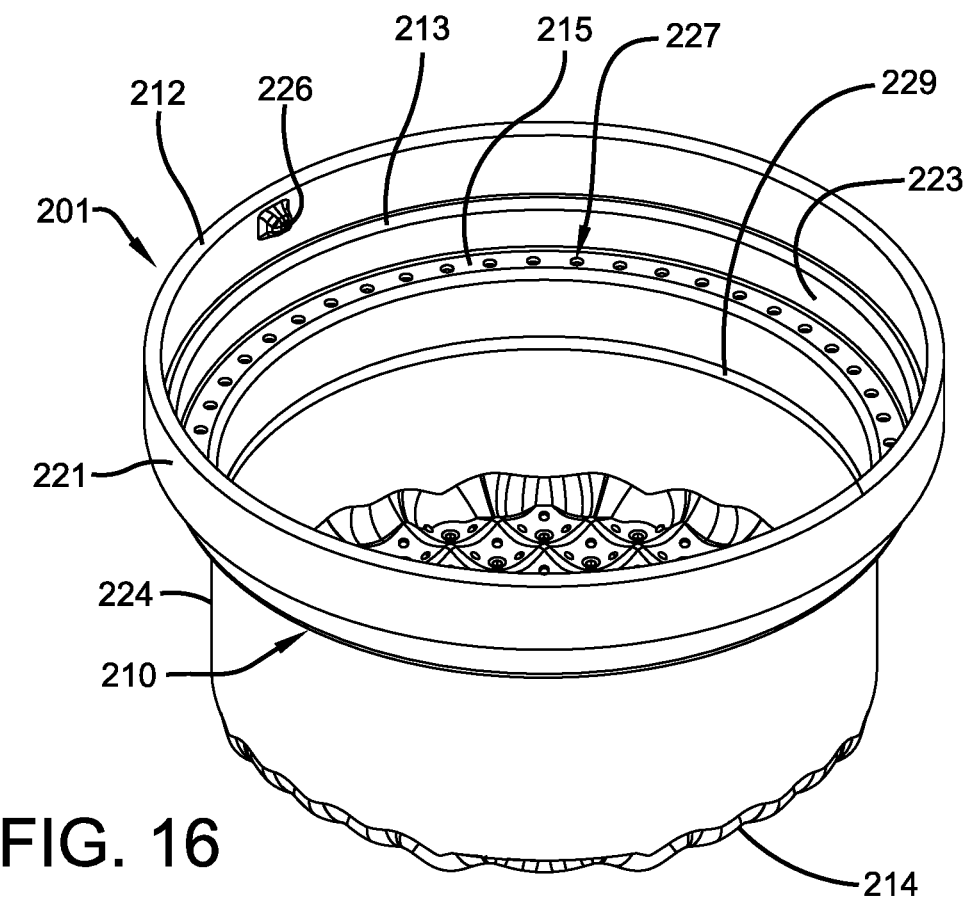
FIG. 16 is a perspective view of a filter in a secondary embodiment.

FIGS. 14 to 16 depict a second embodiment of a coffee brewing system 200 that utilizes a filter 201 similar to the filter 1 described above. The top section 210 and bottom section 250 are similar to the top section 110 and bottom section 150 of the first embodiment described above. However, the top section 210 and bottom section 250 are both double-walled in this embodiment, and the bottom section 250 has a smooth upper section that is amenable to using as a cup for sipping. The lid 270 is the same as above.

The middle section 230, as shown in FIG. 15, is a ring-shaped cylinder with a recessed bottom ring segment 233 that forms a concentric ledge 237 on the cylinder. The bottom ring segment 233 includes one or more tabs 235 (e.g. two to eight, three or four) that are slightly extended portions in both axial and radial directions over both the bottom ring segment 233 and the concentric ledge 237. The tabs 235 provide a tight fit when the middle section 230 is placed onto the top opening of the bottom section 250. When placed on the bottom section 250 the area around the tabs 235 allows for venting from the bottom section 250 to promote more even and free-flowing air/vapor flow. Thus, very little resistance from the air/vapor pressure in the bottom section 250 inhibits the percolating of the water through the filter 201 into the bottom section 250. In an embodiment, the tabs 235 and recessed ring 235 feature can be used on the other sections for venting and a tight, but releasable fit. For example, the lid 270 and upper section 250 may interface with these features. There is no spout or handle in this embodiment of the coffee brewing system 200, and the user can simply drink from the double-walled bottom section 250 that has a smooth lip all around.

The filter 201 in the second embodiment has a bottom surface 214 as described above with the mini-cone units 230 that may have the geometries and patterns as described above. The filter 201 in the second embodiment has a circumferential wall 210 that generally defines three concentric levels, a top level 221 that ends at a rim 212 and has the largest circumference, a middle level 223 has a smaller circumference, and a bottom level 224 has yet a smaller circumference that at the bottom corresponds to the circumference of the bottom surface 214 that it is joined to. Transitions between the levels are angled or horizontal concentric segments 213, 215. In contrast to the first embodiment, the filter 201, when assembled inside the middle section 230, has a top level 221 that will form part of the outer wall of the coffee brewing system 200 and sit on top of the middle section 230 and just below the top section 250. In addition, the inside of the top level 221 has an inset feature 226 that functions to fit into a concomitant feature on the top section 210, such as the fitment feature 116 shown on the top section 210 in the first embodiment. This allows the filter 201 to twist and lock into the top section 210.

The bottom level 224 of the circumferential wall 210 is taller in the second embodiment, and the filter 201 in general encompasses a greater volume than the filter 1 in the first embodiment. A fill line 229 can be seen in FIG. 16. The greater height of the bottom level 224 provides a vertical expansion area for the water and the bloom of the coffee grounds, instead of spilling over horizontally, which may be more likely in the first embodiment of the filter 1. This greater height and volume provides additional room for blooming of the coffee grounds and vapor pressure to dissipate. In addition, in the second embodiment, multiple bloom holes 227 are provided on the horizontal transition area 215 that lead to a clear path downward to the bottom section 250, instead of the horizontal holes in the first embodiment filter 1. Also, in the second embodiment, the bloom holes 227 are positioned above the drip holes (161) of the top section 210. This has the effect that the bloom would have to reach the bottom surface of the water chamber before starting to flow out the bloom holes 227. The bloom holes 227 have a diameter of about 0.055 inches. In an embodiment, this diameter may be 0.03 to 0.1 inches, or 0.04 to 0.07 inches. The total volume encompassed by the bottom level 224 bounded by the bottom surface 214 is about 8.5 in³. In embodiments, this volume may be, for example, 7.5 to 9.5 in³, or 8 to 9 in³. The height of the bottom level 224 is about 1.28 inches. In embodiments, the height may be, for example, 0.9 to 1.5 inches, or 1.1 to 1.4 inches. The fill-line 229 corresponds to the depth of coffee grounds when in use. The distance from the fill line 229 to the top of the bottom level 224 is about 0.4 inches. In embodiments, this distance may be, for example, 0.1 to 1 inch, or 0.25 to 0.6 inches. It is believed that this configuration provides an even further improvement in the coffee flavor over the first embodiment.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner such as the term "comprising." The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. If not apparent from the context, any measurement is to be conducted at 70° F. and 1 atm.

It is claimed:

1. A filter comprising:
   a bottom surface that is an undulating surface comprising a plurality of mini-cone units arranged in a waffle pattern, the mini-cone units comprising one or more holes
   the bottom surface bounded by a circumferential wall extending vertically from the bottom surface;
   wherein the one or more holes in the mini-cone units include a hole at a trough of the mini-cone;
   wherein the mini-cone units further comprise additional holes that are at a sloped angle to a major plane of the bottom surface.

2. The filter of claim 1, wherein the mini-cone units further comprise additional holes along edges of the units.

3. The filter of claim 1, wherein the mini-cone units are frustoconical, frustopyramidal, or approximately frustoconical with a square-shaped footprint.

4. The filter of claim 2, wherein a side cross-section of the bottom surface running through the trough holes of the bottom surface has an approximately sinusoidal shape.

5. The filter of claim 1, wherein the circumferential wall runs from a top rim to the bottom surface; and the circumferential wall comprises multiple concentric levels joined by one or more angled or horizontal transition segments.

6. The filter of claim 5, wherein the circumferential wall comprises multiple holes.

7. The filter of claim 5, wherein at least one of the transition segments includes multiple holes.

8. A system for brewing coffee comprising:
   a top section including a first circumferential wall, the top section being open at a top and including a drip plate with drip holes at a bottom;
   a middle section including a second circumferential wall, the middle section being open at a top and a bottom, the middle section coupled to a filter with a bottom surface comprising holes; and
   a bottom section including a third circumferential wall, the bottom section being open at a top and closed at a bottom;
   wherein the top section, the filter, middle section, and the bottom section are configured to fit together;
   wherein a total hole diameter of all the drip holes and all the holes of the filter is 1:100 to 1:10.

9. The system of claim 8, wherein the holes of the filter and the drip holes are dimensioned to pass 12 ounces of boiling water through from the top section to the bottom section in 3 to 4 minutes, determined with no grounds in the filter.

10. The system of claim 8, wherein the drip holes are concentrically arranged in inner and outer concentric rings.

11. The system of claim 8, wherein the drip holes are smaller than the holes of the filter.

12. The system of claim 8, wherein the filter comprises a circumferential wall with a top level that fits on top of the middle section forming a portion of an outer wall of the system.

13. The system of claim 8, wherein the middle section comprises a bottom ring segment with a concentric ledge that fits into the bottom section of the system, and the bottom ring segment includes one or more tabs that are extended in both axial and radial directions over the bottom ring segment and the concentric ledge.

14. The system of claim 8, wherein the filter comprises a total of 4 to 200 mini-cone units.

15. The system of claim 8, wherein the bottom surface of the filter is an undulating surface comprising a plurality of mini-cone units arranged in a waffle pattern, the mini-cone units comprising one or more holes.

16. The system of claim 15, wherein the mini-cone units comprise holes that are at a sloped angle to a major plane of the bottom surface.

17. The system of claim 8, wherein a major plane of the bottom surface of the filter is planar.

18. The system of claim 8, wherein the top, middle, and bottom sections are configured to fit together by a twist and lock mechanism.

19. The system of claim 15, wherein the mini-cone units are frustoconical, frustopyramidal, or approximately frustoconical with a square-shaped footprint.

20. The system of claim 15, wherein the holes of the mini-cone units are 0.02 to 0.08 inches in diameter.

* * * * *